United States Patent
Salle et al.

(10) Patent No.: US 9,224,280 B2
(45) Date of Patent: Dec. 29, 2015

(54) SECURITY WRAP

(71) Applicant: Johnson Electric S.A., Murten (CH)

(72) Inventors: Vincent Daniel Jean Salle, Cowes (GB); Dominic John Ward, Carisbrooke (GB); Martin Wallace Edmonds, East Cowes (GB); Libing Zhang, Sharon, MA (US)

(73) Assignee: Johnson Electric S.A., Murten (CH)

( * ) Notice: Subject to any disclaimer, the term of this patent is extended or adjusted under 35 U.S.C. 154(b) by 206 days.

(21) Appl. No.: 13/952,311

(22) Filed: Jul. 26, 2013

(65) Prior Publication Data

US 2014/0027159 A1 Jan. 30, 2014

(30) Foreign Application Priority Data

Jul. 27, 2012 (GB) .................................. 1213445.8

(51) Int. Cl.
*H05K 1/02* (2006.01)
*G08B 13/24* (2006.01)
*G08B 13/12* (2006.01)
*G06F 21/87* (2013.01)

(52) U.S. Cl.
CPC .............. *G08B 13/242* (2013.01); *G06F 21/87* (2013.01); *G08B 13/128* (2013.01); *H05K 1/0275* (2013.01); *H05K 2201/09263* (2013.01)

(58) Field of Classification Search
CPC ..................................................... G08B 13/242
See application file for complete search history.

(56) References Cited

U.S. PATENT DOCUMENTS

| 5,103,210 | A | * | 4/1992 | Rode et al. | 340/572.3 |
|---|---|---|---|---|---|
| 5,276,431 | A | * | 1/1994 | Piccoli et al. | 340/572.5 |
| 5,574,431 | A | * | 11/1996 | McKeown et al. | 340/572.3 |
| 5,841,350 | A | * | 11/1998 | Appalucci et al. | 340/572.3 |

FOREIGN PATENT DOCUMENTS

| JP | 2011086034 A | 4/2011 |
|---|---|---|
| WO | WO-2008/002878 A2 | 1/2008 |
| WO | WO-2010/055198 A2 | 5/2010 |

* cited by examiner

*Primary Examiner* — Van Trieu
(74) *Attorney, Agent, or Firm* — Muncy, Geissler, Olds & Lowe, P.C.

(57) ABSTRACT

A security wrap (20) for protecting an electronic component (16) includes a substrate (26) having a first side and a second side opposite to each other. A conductive path (22) is disposed over the first side of the substrate (26) and has first and second ends coupled to the electronic component (16), and a pattern selected from a plurality of predetermined patterns. A layer of adhesive (28) is over the first side of the substrate (26) and bonds the first side of the substrate (26) to the electronic component (16) with the conductive path (22) sandwiched there between.

20 Claims, 6 Drawing Sheets

SECURITY WRAP

CROSS REFERENCE TO RELATED APPLICATIONS

This non-provisional patent application claims priority under 35 §119(a) from Patent Application No. 1213445.8 filed in United Kingdom on Jul. 27, 2012.

FIELD OF THE INVENTION

This invention relates to a security device for an electronic circuit board and in particular, to a flexible security overlay having a randomly assigned security screen pattern.

BACKGROUND OF THE INVENTION

Protecting electronic circuits from unauthorized access is an important consideration when designing apparatus that use electronic circuits that have or may have sensitive and/or confidential information. For example, point of sale (POS) devices collect confidential information about credit cards or bank account details when a purchase is being made.

The protection of such devices can be achieved by a security device commonly referred to as a security wrap. The security wrap forms a part of the device's security system and identifies an attempt to physically access the protected portion of the device. The security wrap physically covers the electronic components being protected which may be a portion of a PCB, the entire PCB or components like a smart card connector, a secure microprocessor and the like. The security wrap may be flexible so as to be able to conform to the physical shape of the PCB, further reducing the opportunities to access the components.

The security wrap provides an electrical connection between two (or more) terminals forming a part of an alarm circuit of the device. In use, when unauthorized physical entry is attempted by removing the security wrap, the connection is broken and the alarm circuit is activated. The function of the alarm circuit is not a part of the instant invention and depends on the security response of the device being protected which may range from a visual and/or audible indication, to shutting down of the device, disabling the device or in an extreme response to total destruction of the device or the components being protected.

Prior art security wraps may be breached by drilling a hole through the security wrap to access the circuit beneath. The conductor is usually arranged in a pattern, herein referred to a security screen. To be successful, one needs to know the exact location of the point they want to access and the design of the security screen. Commonly this is determined using some form of x-ray inspection, which is expensive or by disassembling a sample product, which is destructive.

If a thief can determine how to hack into one device with a security wrap and determine how to bypass the security screen all similar devices are now compromised as each model uses the same security wrap which is fixed to the same PCB within very tight tolerances to ensure good manufacturability and security. However, these tight tolerances means that the thief, having found out how to access one particular device can now access all devices of the same make and model with a high confidence of success, within a short period of time.

SUMMARY OF THE INVENTION

Hence there is a desire for a security wrap system in which should the security be compromised in one device will not mean that the perpetrator can access all similar devices of the same make and model.

This is achieved in the present invention by using a plurality of security wraps having different conductor patterns but which otherwise are identical.

Accordingly, in one aspect thereof, the present invention provides a security wrap for protecting an electronic component, comprising a substrate disposed over the first side of said substrate and having a first side and a second side opposite to each other; a conductive path having first and second ends coupled to the electronic component, and a pattern selected from a plurality of predetermined patterns; and a layer of adhesive over the first side of said substrate and bonding the first side of said substrate to the electronic component with said conductive path sandwiched there between.

Preferably, the pattern of said conductive path is selected from the plurality of predetermined patterns randomly.

Preferably, the pattern of said conductive path is selected from the plurality of predetermined patterns in accordance with an algorithm to reduce the probability of pattern repetition.

Preferably, further comprising a second conductive path disposed over said substrate and overlaying the conductive path and having first and second ends coupled to the electronic component, and a pattern different from the pattern of the conductive path and selected from the plurality of predetermined patterns.

Preferably, the second conductive path is disposed over the second side of said substrate.

Preferably, further comprising a dielectric layer disposed over said conductive path, wherein said second conductive path is disposed over said dielectric layer.

Preferably, said dielectric layer includes a conductive via formed therein; and the second end of said conductive path is coupled to the first end of said second conductive path via the conductive via in said dielectric layer.

Preferably, the electronic component includes an alarm circuit having first and second terminals; and said conductive path and said second conductive path are connected in series between the first and second terminals of the alarm circuit of the electronic component.

Preferably, further comprising an intermittent adhesion modification pattern disposed between the first side of said substrate and said conductive path.

Preferably, said intermittent adhesion modification pattern has a bonding strength between the first side of said substrate and said conductive path less than a bond strength between said conductive path and the electronic component.

Accordingly, in another aspect thereof, the present invention provides a security wrap for protecting a device having an alarm circuit, comprising: a first substrate having a first side and a second side opposite to each other; a first conductive track disposed over the first side of said first substrate, coupled to the alarm circuit of the device, and having a first pattern selected from a plurality of predetermined patterns; a second conductive track disposed over said first substrate, coupled to the alarm circuit of the device, and having a second pattern different from the first pattern and selected from the plurality of predetermined patterns; and a first layer of adhesive over the first side of said first substrate and bonding the first side of said first substrate to the device with said first conductive sandwiched there between.

Preferably, the second conductive track is disposed over the second side of said first substrate.

Preferably, further comprising a dielectric layer disposed over said first conductive track, wherein said second conductive track is disposed over said dielectric layer.

Preferably, the first conductive track and the second conductive track are connected in series.

Preferably, the first conductive track and the second conductive track have predetermined resistances and are connected in parallel.

Preferably, further comprising: a second substrate overlaying said first substrate; a third conductive track disposed over said second substrate, coupled to the alarm circuit of the device, and having a third pattern selected from the plurality of predetermined patterns; a fourth conductive track disposed over said second substrate, coupled to the alarm circuit of the device, and having a fourth pattern different from the third pattern and selected from the plurality of predetermined patterns; and a second layer of adhesive over of said second substrate and bonding said second substrate to the second side of said first substrate.

Preferably, further comprising a dielectric layer between said third conductive track and the fourth conductive track and having a conductive via form therein, wherein said third conductive track and said fourth conductive track are connected in series via the conductive via in said dielectric layer.

Preferably, further comprising the third and fourth conductive tracks are disposed over the opposite sides of the second substrate.

Preferably, further comprising: a third substrate overlaying said first substrate and said second substrate; a fifth conductive track disposed over said third substrate, coupled to the alarm circuit of the device, and having a fifth pattern selected from the plurality of predetermined patterns; a sixth conductive track disposed over said third substrate, coupled to the alarm circuit of the device, and having a sixth pattern different from the fifth pattern and selected from the plurality of predetermined patterns; and a third layer of adhesive over of said third substrate and bonding said third substrate to said second substrate.

Preferably, the first pattern of said first conductive track and the second pattern of said second conductive track are selected from the plurality of predetermined patterns in accordance with an algorithm to reduce the probability of pattern repetition in a security wrap production process.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labelled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
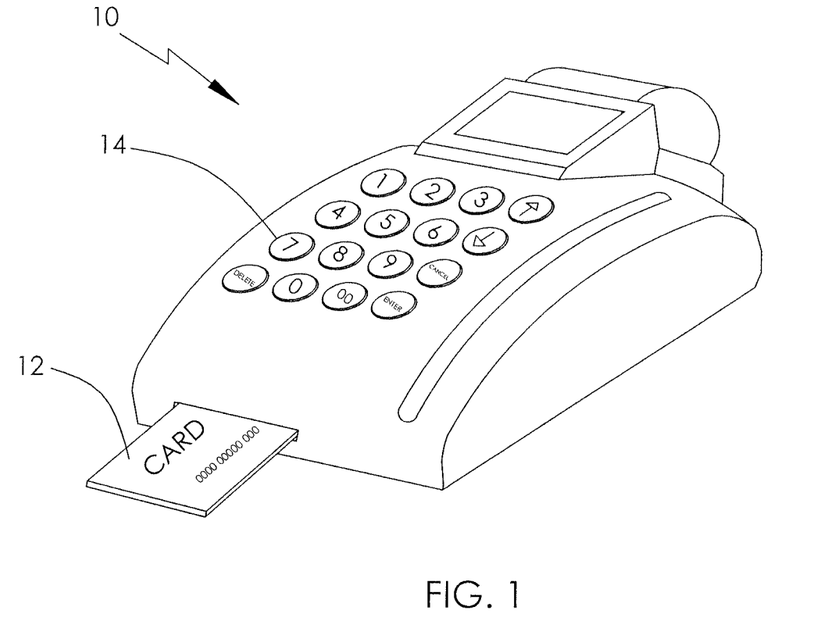
FIG. 1 illustrates an electronic device fitted with a security wrap.

FIG. 1 illustrates an electronic device, by way of example, in the form of a point of sale (POS) device 10. The POS device 10 is arranged to read details from a card 12, such as a credit card and has a key pad 14 for entering information and giving instructions to the PUS device 10. A security wrap is used to protect the data stored in the memory of the FOS device 10, generally some form of a memory chip. If unprotected, a perpetrator may access the contents of the memory in the POS device 10.

Figure 2:
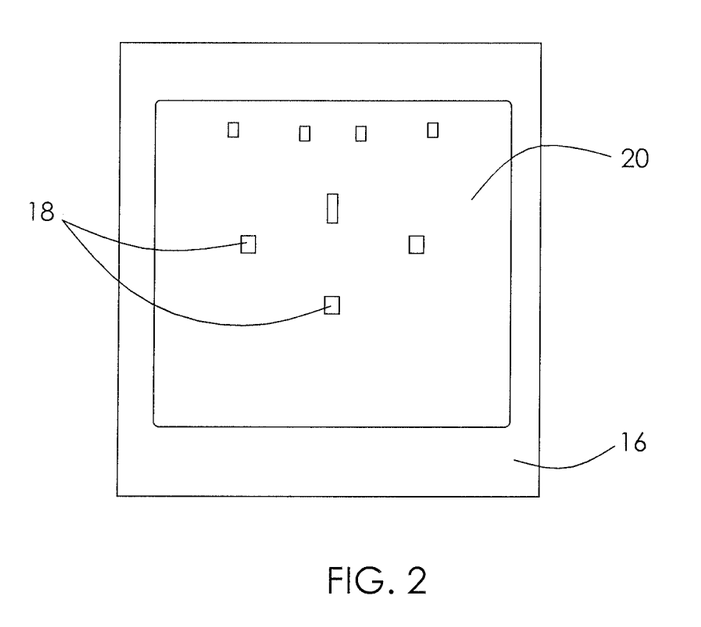
FIG. 2 illustrates the security wrap fitted to a PCB of the device of FIG. 1.

A PCB 16 of device 10 is shown in FIG. 2 with a security wrap 20 fitted thereon. Security wrap 20 appears as a flexible sheet overlaying PCB 16. In accordance with a preferred embodiment of the present invention, a substrate of the security wrap 20 is opaque so as to hide a security screen (not shown in FIG. 2) and the underlying circuitry on PCB 16. Holes 18 in security wrap 20 and PCB 16 facilitate the mounting of the PCB 16 to a housing of device 10.

Figure 3:
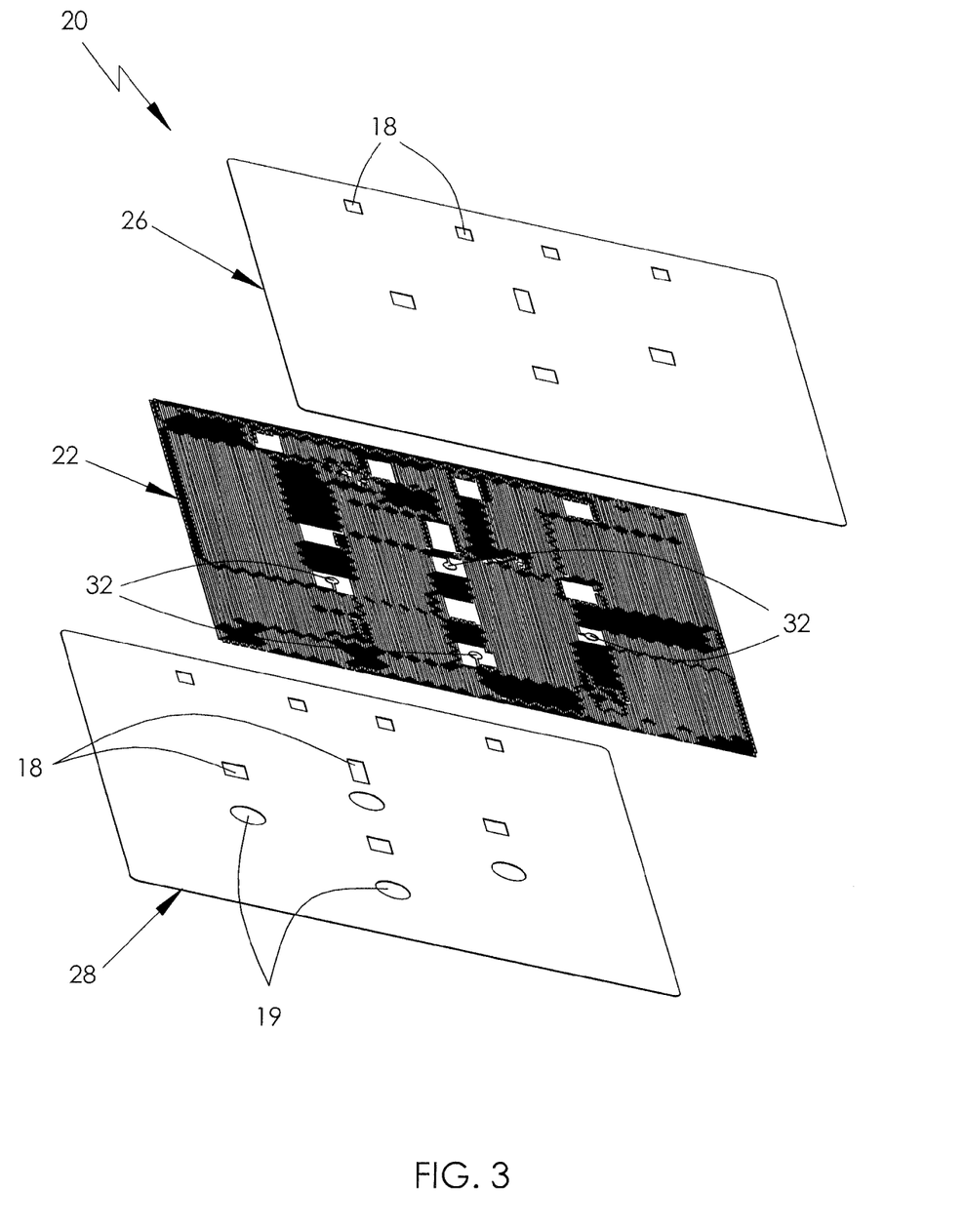
FIG. 3 is an exploded view of the security wrap.

FIG. 3 illustrates the construction of security wrap 20 in accordance with an embodiment of the present invention. By way of example, FIG. 3 illustrates security wrap 20 as a single layer wrap having a single security screen 30 (shown in FIG. 4A-4C) formed by one or more conductors 22. The security wrap 20 has a base layer or substrate 26 which is preferably a flexible plastic sheet, optionally a PET sheet. An intermittent layer of adhesion modifier (not shown in the Figures) is applied over the substrate 26, then the security screen 30 is formed by printing the conductor(s) 22 and screen terminals 32 on to the base layer 26, over the layer of adhesion modifier. Optionally, this is done by applying a conductive ink using a screen printing process but other printing processes may be used. This allows very fine conductors 22 to be formed with very fine spacings separating the lines of the conductor 22, depending on the resolution of the printer. The use of the layer of adhesion modifier is optional and produces a security screen 30 with breakable conductors 22. Alternatively, the substrate 26 and the security screen 30 can be produced as a flexible printed circuit, with the security screen 30 being formed by etching a copper layer fixed on the substrate 26.

The area to be protected by the security screen 30 should be densely covered by the conductor 22 with the width of the conductor 22 as thin as possible and densely packed to avoid any opportunities to cut open the security wrap 30 without severing the conductor 22. Preferably, the width of the conductor 22 and the width of the spacings are substantially equal and ideally are between 1 and 1000 microns. However, currently widths of 200 to 300 microns are preferred as a good compromise between costs and security level as smaller widths require printing processes with finer resolutions which come with a price.

A layer of adhesive 28 is then applied over the security screen 30 to bond the security wrap 20 to the PCB 16 of the device. Adhesive layer 28 directly bonds the substrate 26 to the PCB 16 in areas where the conductor 22 is absent. The adhesive layer 28 also helps to bond the security screen 30 to the substrate 26. The adhesive layer 28 may be applied as a preformed adhesive layer but preferably is applied using a suitable printing method such as screen printing. Preferably, the adhesive is a pressure sensitive adhesive which bonds to the PCB 16 when pressed against it.

As the adhesive must be non-conductive to avoid short circuiting the security screen 30 and the PCB 16, holes 19 in the adhesive layer 28 are required to allow the screen terminals 32 to be electrically connected with the alarm terminals. Connections between the screen terminals 32 and the alarm terminals may be made by any convenient manner. For example, curved metal discs, commonly referred to as metal domes may be disposed on the adhesive layer side to connect the screen terminals 32 to the alarm terminals and provide contact points for the keys of the key pad. Alternatively connection may be made by carbon pills directly printed on the screen terminals 32, which are permanently compressed against the PCB 16, or by Zero Insertion Force (ZIF) or Low Insertion Force (LIF) connectors.

Figure 4A:
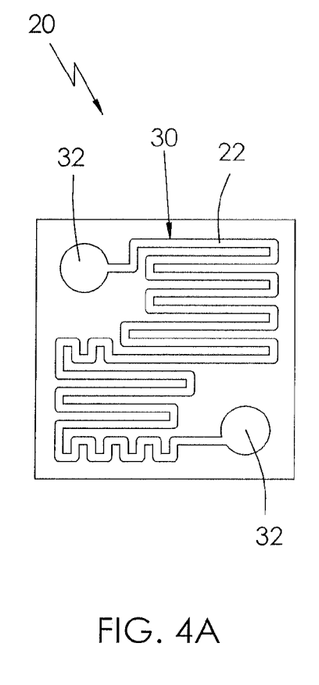
FIGS. 4A to 4C are schematic representations of three security screens as used in the security wrap.
Figure 4B:
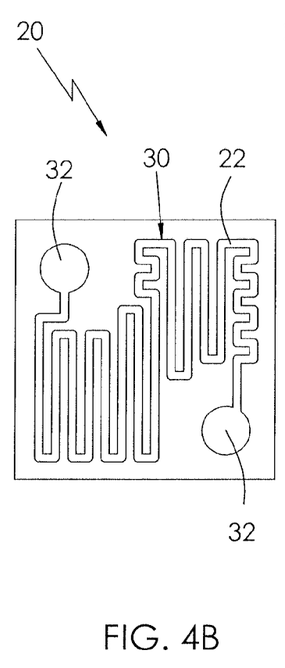
Figure 4C:
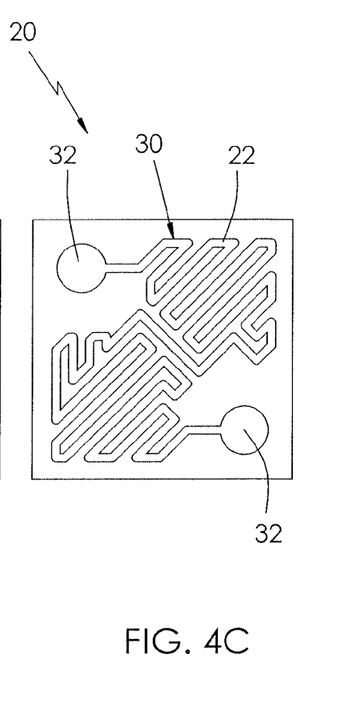

By way of example, FIGS. 4A-C illustrate three possible patterns of conductors 22 for use as security screen 30. FIG. 4A illustrates a first pattern, in which security screen 30 is formed by one conductor 22 that terminates at two screen terminals 32. The screen terminals 32 may be simply the ends of the conductor 22. Additional screen terminals may be formed between the ends of the conductor 22, depending on the requirements of the alarm circuit. Likewise, FIG. 4B illustrates a second pattern, in which security screen 30 is formed by one conductor 22 that terminates at two screen terminals 32. The pattern shown in FIG. 4B is formed by flipping the first pattern shown in FIG. 4A about a diagonal passing through the two terminals. FIG. 4C illustrates a third pattern, in which security screen 30 is formed by one conductor 22, terminating at a pair of terminals 32. The third pattern is different from the other two patterns. In accordance with an embodiment of the present invention, screen terminals 32 also function as contact pads.

In accordance with the present invention, screen 30 may have additional patterns. The more patterns there are, the less likelihood of two devices sharing the same pattern. This would lead to lower probability of the device being comprised by a perpetrator who has previously comprised another device.

Ideally, the conductor patterns are designed to form a conductor 22 that is as thin as reliably possible and arranged so that portions of the conductor 22 are spaced apart by a minimum spacing that is reliably reproducible and reliably separated so as not to short out sections of the conductor 22. The conductor pattern need not completely fill the wrap 20. Indeed, the wrap 20 may be used to visually obscure or hide other parts of the PCB 16 with the conductor 22 only being used to protect a small portion of the PCB 16, such as the portion supporting the memory chip or microprocessor. By making the security wraps with a number of different security screen designs and randomly manufacturing or randomly distributing the end products the likelihood of a perpetrator acquiring two devices with identical security wraps is greatly reduced.

Figure 5:
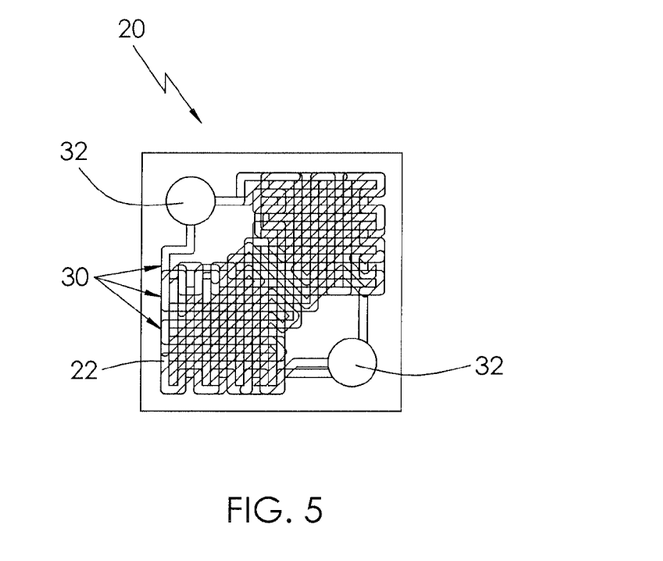
FIG. 5 is a schematic view of a multi-layer conductor for use in the security wrap.

FIG. 5 illustrates a multi-layer security wrap 20. In this embodiment, all three security screens of FIG. 4 are overlaid to form a three layer security wrap 20. As shown in FIG. 5, the spaces between adjacent potions of the conductors 22 in one layer overlap portions of the conductors 22 of the other layers, thus significantly increasing the difficulty to find a clear path through the security wrap 20. In the simple embodiment shown in FIG. 5, each security screen 30 has two screen terminals interconnected by a single conductor 22. Depending on the alarm circuit, the security screens 30 may be connected to respective alarm terminals, connected in series to a single alarm circuit, or connected in parallel to a single alarm circuit. For the parallel connection, in one specific embodiment, the security screens 30 have a predetermined, finite resistance and the alarm circuit is able to monitor changes in the resistance of the connection across the alarm terminals indicating tampering of the security wrap 20. The three security screens 30 each have a conductor pattern chosen from a predetermined set of patterns and each of the conductor patterns of the security screens of any security wrap are different.

Breaking any one of the three conductors 22 would change the current signal in the corresponding pair of terminals 32. Overlaying multiple security screens 30 having conductors 22 with patterns not coinciding with each other significantly increases the circuitry density of security wrap 20 beyond what is otherwise achievable by a single security screen.

A screen 30 with a denser pattern of conductor 22 provides a higher security level because it would be more difficult to penetrate screen 30 without breaking conductor 22. Therefore, it is preferable to have a thin conductor 22 spreading densely throughout the area of the screen. It is also preferable for conductor 22 to be made of an easily breakable material or arranged such that the conductor 22 is readily broken should someone attempt to remove the security wrap 20, to further increase the sensitivity of screen 30.

Figure 6:
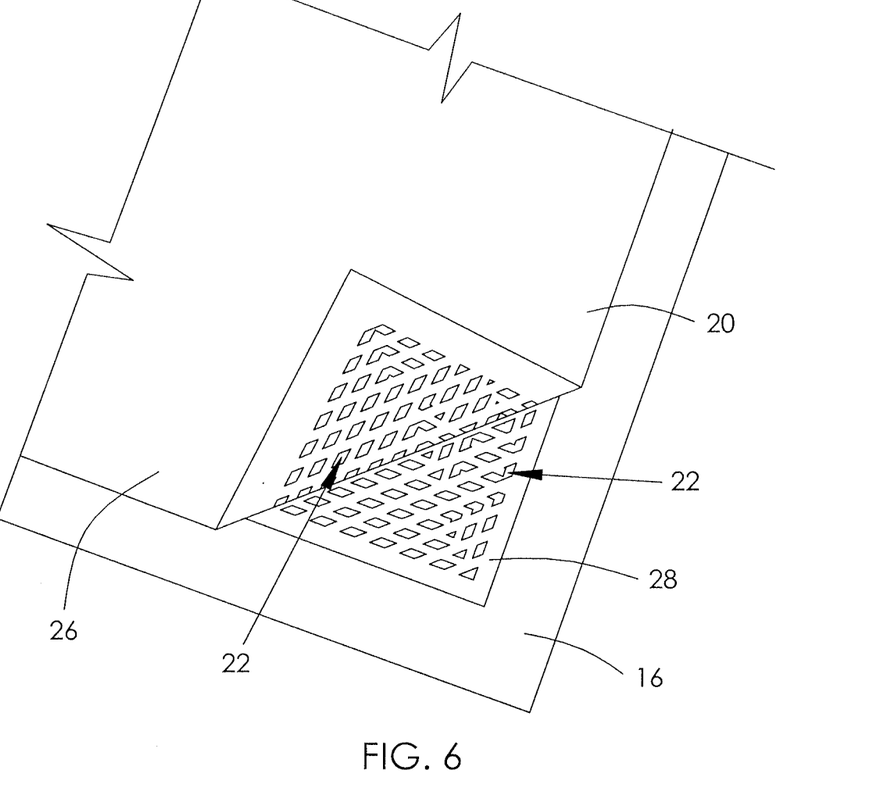
FIG. 6 is a schematic view of a partially separated security wrap.
Figure 7:
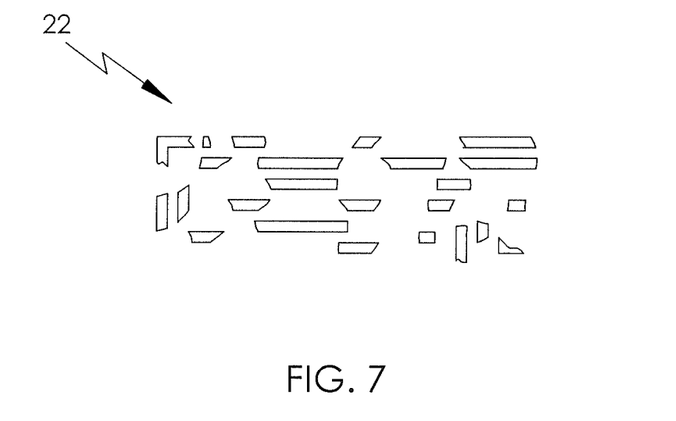
FIG. 7 is a schematic view of a part of a security screen following separation of the security wrap.

FIG. 6 illustrates an attempt to remove a security wrap 20 having breakable conductors 22, as described in relation to FIG. 3, after it has been fitted to the PCB 16. As the corner of the security wrap 20 is lifted from the PCB 16, the conductor 22 is torn apart, with part of the conductor 22 remaining glued to the PCB and part of the conductor 22 remaining attached to the substrate 26. Actually, the pattern created by the conductor 22 on the substrate 26 and the PCB 16 conforms to the pattern of the layer of adhesion modifier. The bond between the conductor 22 and the substrate 26 is stronger than the bond between the conductor 22 and the adhesive 28. However, the bond between the conductor 22 and the adhesion modifier is weaker than the bond between the conductor 22 and the adhesive 28. Hence the conductor 22 remains bonded to the adhesive layer 28 where the adhesion modifier pattern was applied and remains bonded to the substrate 26 where the adhesion modifier pattern was not applied. Thus after separation, the conductor 22 looks something like the illustration of FIG. 7 and the connection between the two screen terminals 32 is open circuited.

Figure 8:
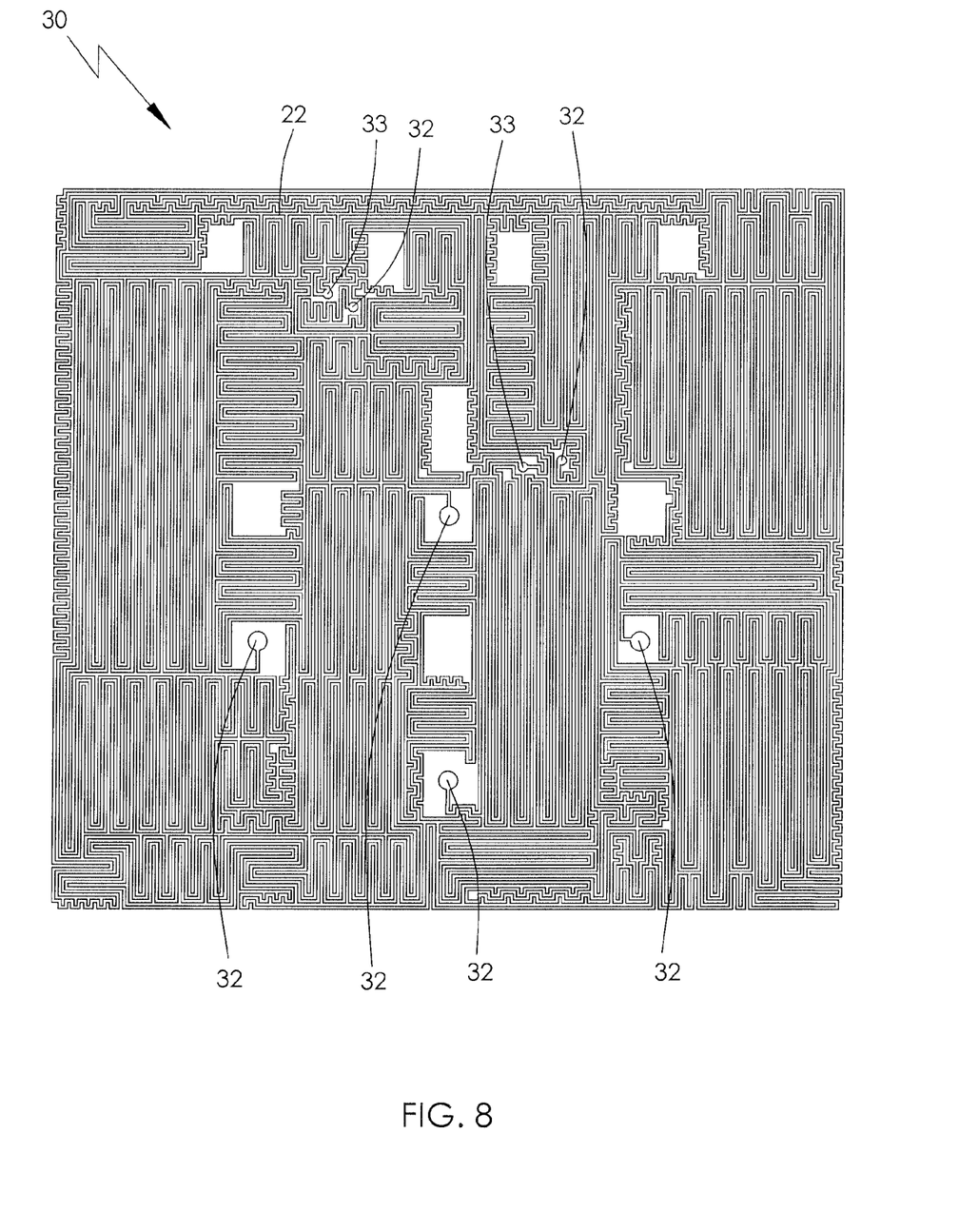
FIG. 8 is a view of the security wrap ready to be fitted to the PCB of the device.

In accordance with an embodiment shown in FIG. 8, security screen 30 is formed by a plurality of conductors 22, each terminating on two screen terminals 32, optionally in the form of contact pads. The number of screen terminals 32, the number of conductor 22s and the number of security screens 30 depend on the security level required for the device and the arrangement of the alarm circuit. Also shown are smaller screen terminals 32 which do not form contact pads and additional screen terminals 33 which are formed between the ends of a conductor 22.

For a multi-layer security wrap 20, meaning a security wrap 20 with more than one security screen 30, the arrangement is similar, except that each additional security screen 30 is printed on to a dielectric layer 36 printed on the preceding security screen 30. In this case the substrate 26 and first security screen 30 may be a flexible printed circuit (FPC) with the subsequent security screens 30 being formed using the printed conductive inks technology. For a multi-layer security wrap 20 with breakable conductors 22 an intermittent layer of adhesive modifier is applied between the substrate 26 and the first security screen 30 and between the dielectric layers 36 and the subsequent security screens 30.

Figure 9:
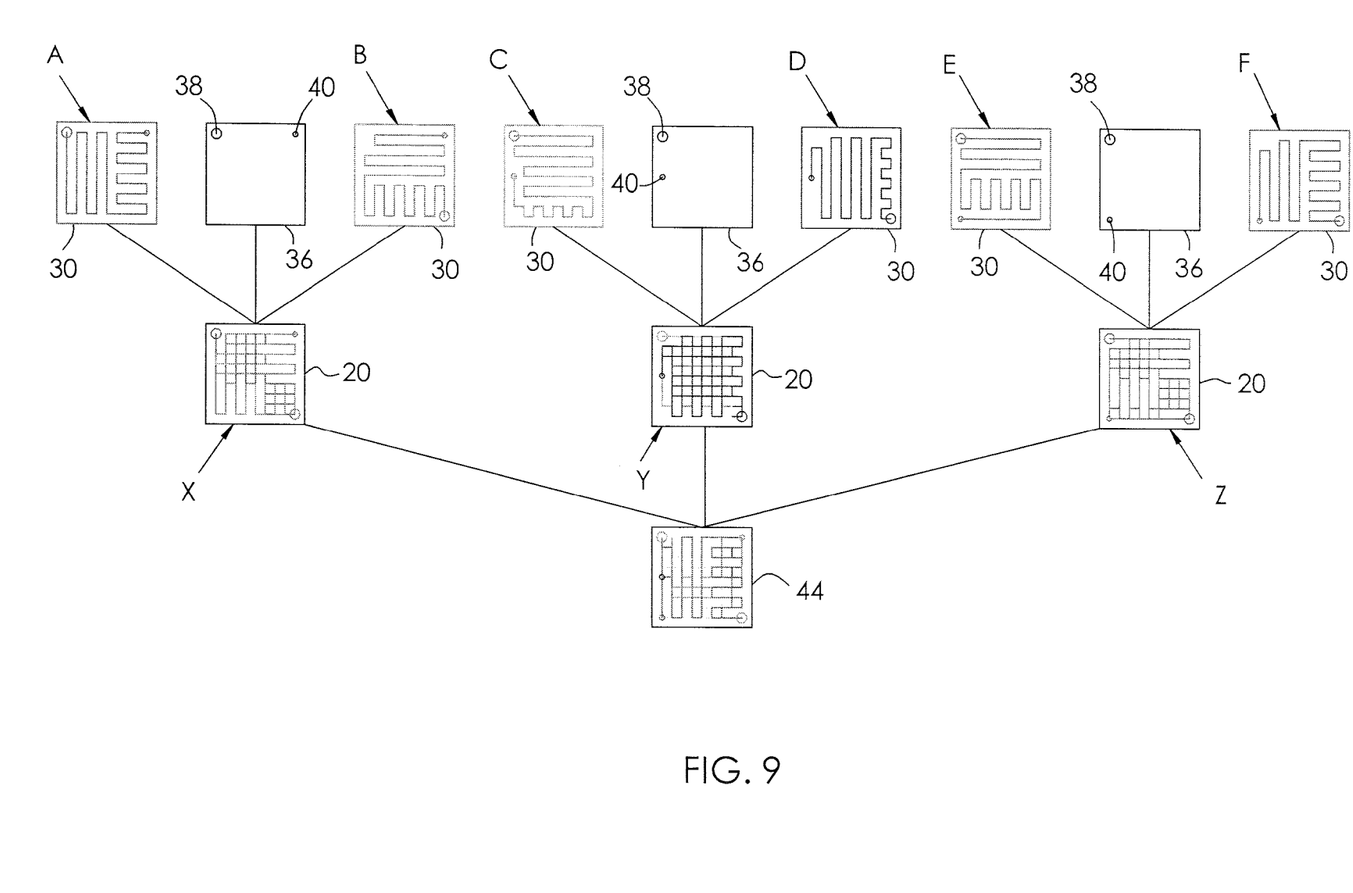
FIG. 9 is a schematic representation of how to produce a two layer security screen.

FIG. 9, by way of example, schematically illustrates the random selection of security screens for a multi-layer security wrap. A two layer security screen with six predetermined conductor patterns is used as the example. The substrate, adhesive modifier (if used) and the adhesive layer are omitted in the schematic although is should be realized that the first security screen is printed on to a substrate (with or without an imposing adhesion modifier layer).

For security wrap X a first security screen 30 having a conductor pattern A is printed on to the substrate. A dielectric layer 36 is applied to the first security screen 30 by printing a solid layer of dielectric ink over the first security screen 30. A second security screen 30 having a conductor pattern B is then printed on the dielectric layer 36. The conductor pattern A has ends forming a first and second screen terminals 32, the first screen terminal 32 is formed as a contact pad. The ends of conductor pattern B has ends forming a third and fourth screen terminals, with the fourth screen terminal forming a contact pad. Dielectric layer 36 has two holes 38, 40, which align with the first and second screen terminals. The third screen terminal also aligns with hole 40 aligned with the second screen terminal such that during printing of the second screen terminal, the conductive ink fills hole 40 and forms a conductive path connecting the second screen terminal to the third screen terminal such that the two conductors 22 are connected in series to form a single electric circuit. Hole 38 in the dielectric layer 36 aligned with the first screen terminal accommodates a connector joining the first screen terminal to a alarm terminal on the PCB 16. Pattern B is different from Pattern A and arranged such that the conductor 22 of the second screen 30 at least partially overlays the space between adjacent portions the conductor 22 of the first security screen 30, to form an image similar to that shown in the image of security wrap X. Security wraps Y & Z are similarly formed with conductor patterns C & D being used for security wrap Y and conductor patterns E & F being used for security wrap Z.

Image 44 of FIG. 9 is a schematic representation of the conductor images of security wraps X, Y & Z, overlaid to show the combined image of the conductors 22 using three alternative security wraps. As can be seen, the protected area is fully or substantially fully covered by conductors 22 leaving little opportunities for finding a single point for penetrating the security wrap which will be effective for all three versions of the security wrap. Thus greatly reducing chances of successful penetration of the security wrap without extensive further research and testing to determine which of the three alternative security screen arrangements is being used in any single security wrap, thus greatly increasing the security level.

By increasing the number of alternative conductor pattern combinations, the difficulty of obtaining samples of all combinations to determine a safe penetration location or method also increases.

During assembly of the electronic device, the security wraps are supplied to the assembly line in batches. While the batches may contain security wraps with a single security screen pattern, with subsequent batches having a different security screen pattern to the preceding batch, it is preferable that each batch of security wraps contains a random assortment of security wraps with different conductor patterns.

Also, while the adhesive layer may be transparent, it is highly preferred that the adhesive is opaque to avoid exposing the pattern of the conductor(s) before or during fitting of the security wrap to the PCB.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

For example, although the invention has been described using a security wrap having frangible conductors, the invention may also be practiced using a security wrap in which the security screen is not arranged to be destroyed by attempts to remove the security wrap. Such security wraps may be formed using FPC technology wherein the security screen is etched from a copper sheet fixed to a flexible substrate as well as by using printed electronic methods using special inks as described above.

The invention claimed is:

1. A security wrap for protecting an electronic component, comprising:
   a substrate having a first side and a second side opposite to each other;
   a conductive path disposed over the first side of said substrate and having first and second ends coupled to the electronic component, and a pattern selected from a plurality of predetermined patterns;
   screen terminals printed on the substrate;
   a layer of adhesive over the first side of said substrate and bonding the first side of said substrate to the electronic component with said conductive path sandwiched there between; and
   holes formed in the layer of adhesive, the holes being disposed to align with the screen terminals.

2. The security wrap of claim 1, wherein the pattern of said conductive path is selected from the plurality of predetermined patterns randomly.

3. The security wrap of claim 1, further comprising a second conductive path disposed over said substrate and overlaying the conductive path and having first and second ends coupled to the electronic component, and a pattern different from the pattern of he conductive path and selected from the plurality of predetermined patterns.

4. The security wrap of claim 3, wherein the second conductive path is disposed over the second side of said substrate.

5. The security wrap of claim 3, further comprising a dielectric layer disposed over said conductive path, wherein said second conductive path is disposed over said dielectric layer.

6. The security wrap of claim 5, wherein:
   said dielectric layer includes a conductive via formed therein; and
   the second end of said conductive path is coupled to the first end of said second conductive path via the conductive via in said dielectric layer.

7. The security wrap of claim 6, wherein:
   the electronic component includes an alarm circuit having first and second terminals; and
   said conductive path and said second conductive path are connected in series between the first and second terminals of the alarm circuit of the electronic component.

8. The security wrap of claim 1, further comprising an intermittent adhesion modification pattern disposed between the first side of said substrate and said conductive path.

9. The security wrap of claim 8, wherein said intermittent adhesion modification pattern has a bonding strength between the first side of said substrate and said conductive path less than a bond strength between said conductive path and the electronic component.

10. A security wrap for protecting an electronic component, comprising;
    a substrate having a first side and a second side opposite to each other;

a conductive path disposed over the first side of said substrate and having first and second ends coupled to the electronic component, and a pattern selected from a plurality of predetermined patterns;

a layer of adhesive over the first side of said substrate and bonding the first side of said substrate to the electronic component with said conductive path sandwiched there between, wherein the pattern of said conductive path is selected from the plurality of predetermined patterns in accordance with an algorithm to reduce the probability of pattern repetition.

11. A security wrap for protecting a device having an alarm circuit, comprising:
a first substrate having a first side and a second side opposite to each other;
a first conductive track disposed over the first side of said first substrate, coupled to the alarm circuit of the device, and having a first pattern selected from a plurality of predetermined patterns;
a second conductive track disposed over said first substrate, coupled to the alarm circuit of the device, and having a second pattern different from the first pattern and selected from the plurality of predetermined patterns;
screen terminals printed on the first substrate;
a first layer of adhesive over the first side of said first substrate and bonding the first side of said first substrate to the device with said first conductive sandwiched there between; and
holes formed in the first layer of adhesive, the holes being disposed to align with the screen terminals.

12. The security wrap of claim 11, wherein the second conductive track is disposed over the second side of said first substrate.

13. The security wrap of claim 11, further comprising a dielectric layer disposed over said first conductive track, wherein said second conductive track is disposed over said dielectric layer.

14. The security wrap of claim 11, wherein the first conductive track and the second conductive track are connected in series.

15. The security wrap of claim 11 wherein the first conductive track and the second conductive track have predetermined resistances and are connected in parallel.

16. The security wrap of claim 11, further comprising:
a second substrate overlaying said first substrate;
a third conductive track disposed over said second substrate, coupled to the alarm circuit of the device, and having a third pattern selected from the plurality of predetermined patterns;
a fourth conductive track disposed over said second substrate, coupled to the alarm circuit of the device, and having a fourth pattern different from the third pattern and selected from the plurality of predetermined patterns; and
a second layer of adhesive over said second substrate and bonding said second substrate to the second side of said first substrate.

17. The security wrap of claim 16, further comprising a dielectric layer between said third conductive track and the fourth conductive track and having a conductive via form therein, wherein said third conductive track and said fourth conductive track are connected in series via the conductive via in said dielectric layer.

18. The security wrap of claim 16, wherein the third and fourth conductive tracks are disposed over the opposite sides of the second substrate.

19. The security wrap of claim 16, further comprising:
a third substrate overlaying said first substrate and said second substrate;
a fifth conductive track disposed over said third substrate, coupled to the alarm circuit of the device, and having a fifth pattern selected from the plurality of predetermined patterns;
a sixth conductive track disposed over said third substrate, coupled to the alarm circuit of the device, and having a sixth pattern different from the fifth pattern and selected from the plurality of predetermined patterns; and
a third layer of adhesive over of said third substrate and bonding said third substrate to said second substrate.

20. A security wrap for protecting a device having an alarm circuit, comprising:
a first substrate having a first side and a second side opposite to each other;
a first conductive track disposed over the first side of said first substrate, coupled to the alarm circuit of the device, and having a first pattern selected from a plurality of predetermined patterns;
a second conductive track disposed over said first substrate, coupled to the alarm circuit of the device, and having a second pattern different from the first pattern and selected from the plurality of predetermined patterns; and
a first layer of adhesive over the first side of said first substrate and bonding the first side of said first substrate to the device with said first conductive sandwiched there between,
wherein the first pattern of said first conductive track and the second pattern of said second conductive track are selected from the plurality of predetermined patterns in accordance with an algorithm to reduce the probability of pattern repetition in a security wrap production process.

* * * * *